(12) United States Patent
Pauls et al.

(10) Patent No.: US 6,312,000 B1
(45) Date of Patent: Nov. 6, 2001

(54) WHEELCHAIR FENDER AND METHOD OF MOUNTING WHEELCHAIR FENDER

(75) Inventors: Darryl R. Pauls, Visalia; Paul C. Dickie, Clovis; Darin J. Trippensee, Fresno, all of CA (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/430,438

(22) Filed: Oct. 29, 1999

(51) Int. Cl.[7] ....................................................... B62M 1/14
(52) U.S. Cl. ...................... 280/250.1; 180/907; D12/131
(58) Field of Search ........................ 280/250.1; D12/131; 180/907, 908, 65.1, 11; 297/DIG. 4

(56) References Cited

U.S. PATENT DOCUMENTS 4,815,555 * 3/1989 Kishi et al. ........................... 180/227
5,857,538 * 1/1999 Chambers ............................. 180/219

FOREIGN PATENT DOCUMENTS 10-35562 * 2/1998 (JP) .

* cited by examiner

Primary Examiner—Daniel G. DePumpo
Assistant Examiner—J. Allen Shriver
(74) Attorney, Agent, or Firm—MacMillan, Sobanski & Todd, LLC

(57) ABSTRACT

A wheelchair swing-arm is adapted to be pivotally connected to a wheelchair base frame and support a wheelchair drive wheel. A fender is supported in a substantially fixed position relative to the wheelchair swing-arm. A method for attaching a fender to a wheelchair includes the steps of providing a wheelchair having a base frame and a swing-arm pivotally connected to the base frame and a drive wheel motor supported by the swing-arm, and supporting a fender in a substantially fixed position relative to the swing-arm.

5 Claims, 5 Drawing Sheets

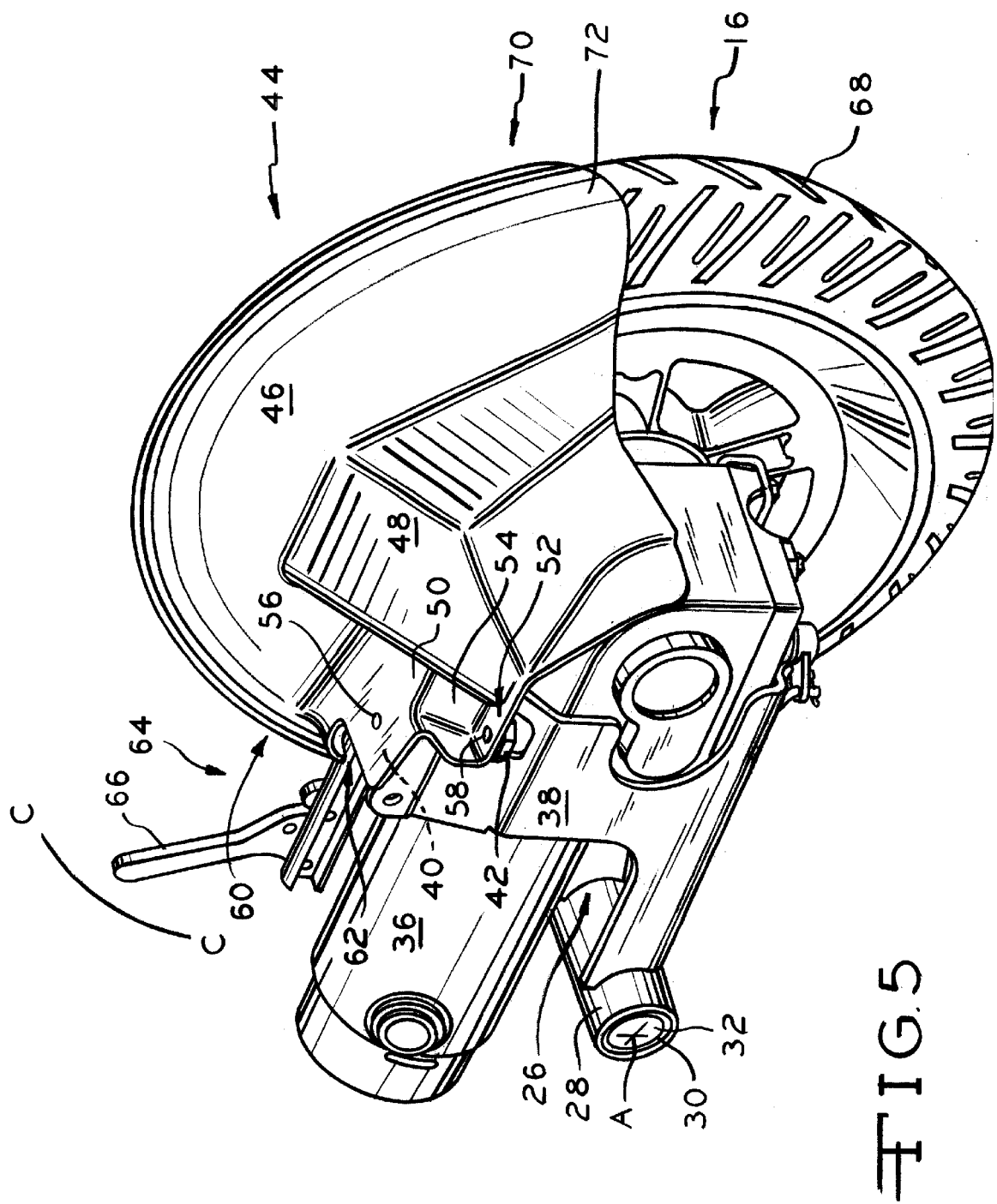

WHEELCHAIR FENDER AND METHOD OF MOUNTING WHEELCHAIR FENDER

BACKGROUND

Fenders are guards that are adapted to be positioned over wheels and that are shaped to block water and other substances and debris that may be kicked up from a supporting surface. Fenders are common to many land vehicles, including motor vehicles, such as automobiles and various types of land equipment, and self-propelled vehicles, such as bicycles and the like.

However, not all land vehicles are equipped with fenders. For instance, wheelchairs are not equipped with fenders. There are generally two types of wheelchairs: manually driven wheelchairs and power wheelchairs. Manually driven wheelchairs are provided with relatively large driven wheels that are driven by a wheelchair occupant. Fenders could interfere with the occupants ability to operate the driven wheels and thus are impractical. The driven wheels of power wheelchairs are not driven by the occupant or by an attendant. Instead, the driven wheels are driven by motors. Hence, fenders would not necessarily interfere with the operation of the driven wheels. However, with the advent of independent suspensions, the driven wheels may have a tendency to bottom out in or come into contact with the fenders when traversing obstacles or rough terrain and thus affect the operation of the drive wheels. A wheelchair fender is needed that does not interfere with the operation of the drive wheels.

SUMMARY

The invention is directed towards a wheelchair fender that does not interfere with the operation of the drive wheels. The fender is supported in a substantially fixed position relative to a wheelchair swing-arm. The swing-arm is adapted to be pivotally connected to a wheelchair base frame and further adapted to support a wheelchair drive wheel.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a rear perspective view of the fender, swing-arm and drive wheel assembly shown in FIGS. 3 and 4.

DESCRIPTION

Figure 1:
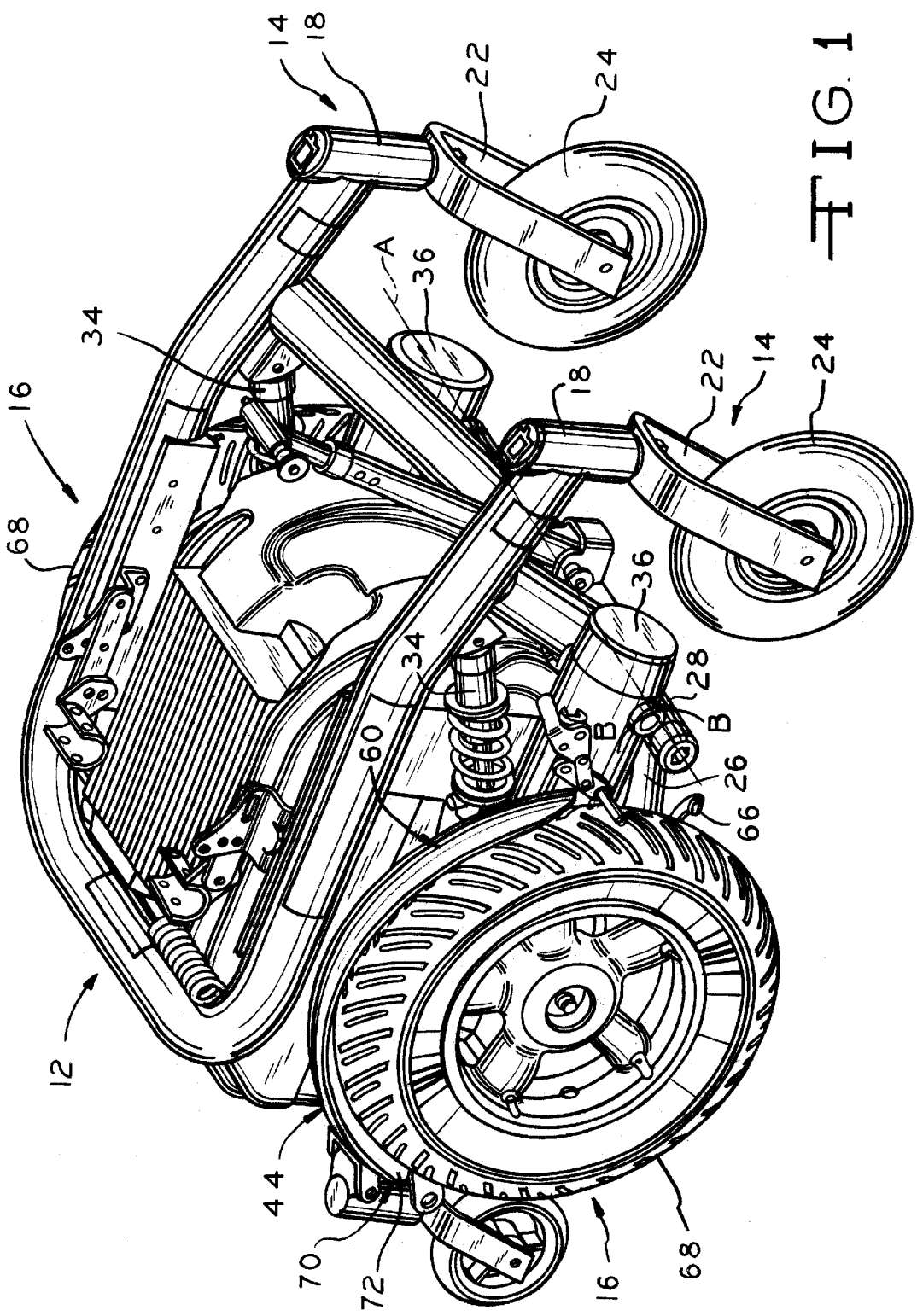
FIG. 1 is an environmental front perspective view of a wheelchair drive wheel fender that remains in a constant position relative to the drive wheel.

Now with reference to the drawings, there is illustrated a power wheelchair having a base frame 12. The base frame 12 is adapted to support a seat frame (also not shown). The seat frame may be a tilting or non-tilting seat frame. The base frame 12 is supported on a supporting surface by a pair of front casters 14 and a pair of rear drive wheels 16.

The front casters 14 are connected to opposing sides of the base frame 12 via caster housings 18. The caster housings 18 shown are attached to the front end of the base frame 12. Each caster housing 18 defines a vertically oriented cylindrical bore for receiving a caster fork stem and bearing (not shown). The caster fork stem is connected to a caster fork 22. The fork 22, in turn, rotatably supports a caster or wheel 24. It should be understood that the front casters 14 swivel about the caster fork stems so as to achieve greater mobility with the wheelchair.

Figure 2:
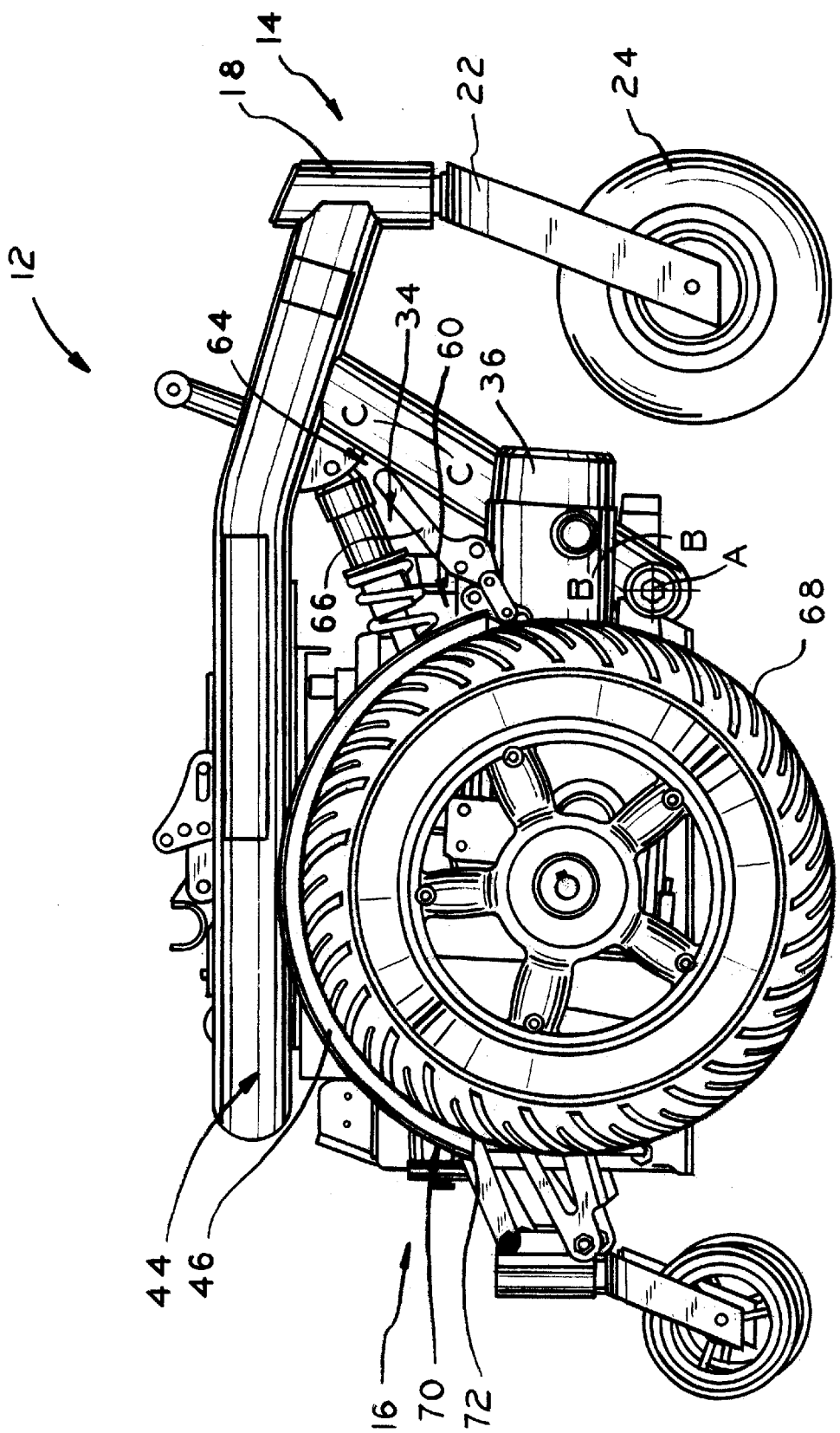
FIG. 2 is an environmental side elevational view of a drive wheel fender shown in FIG. 1.
Figure 3:
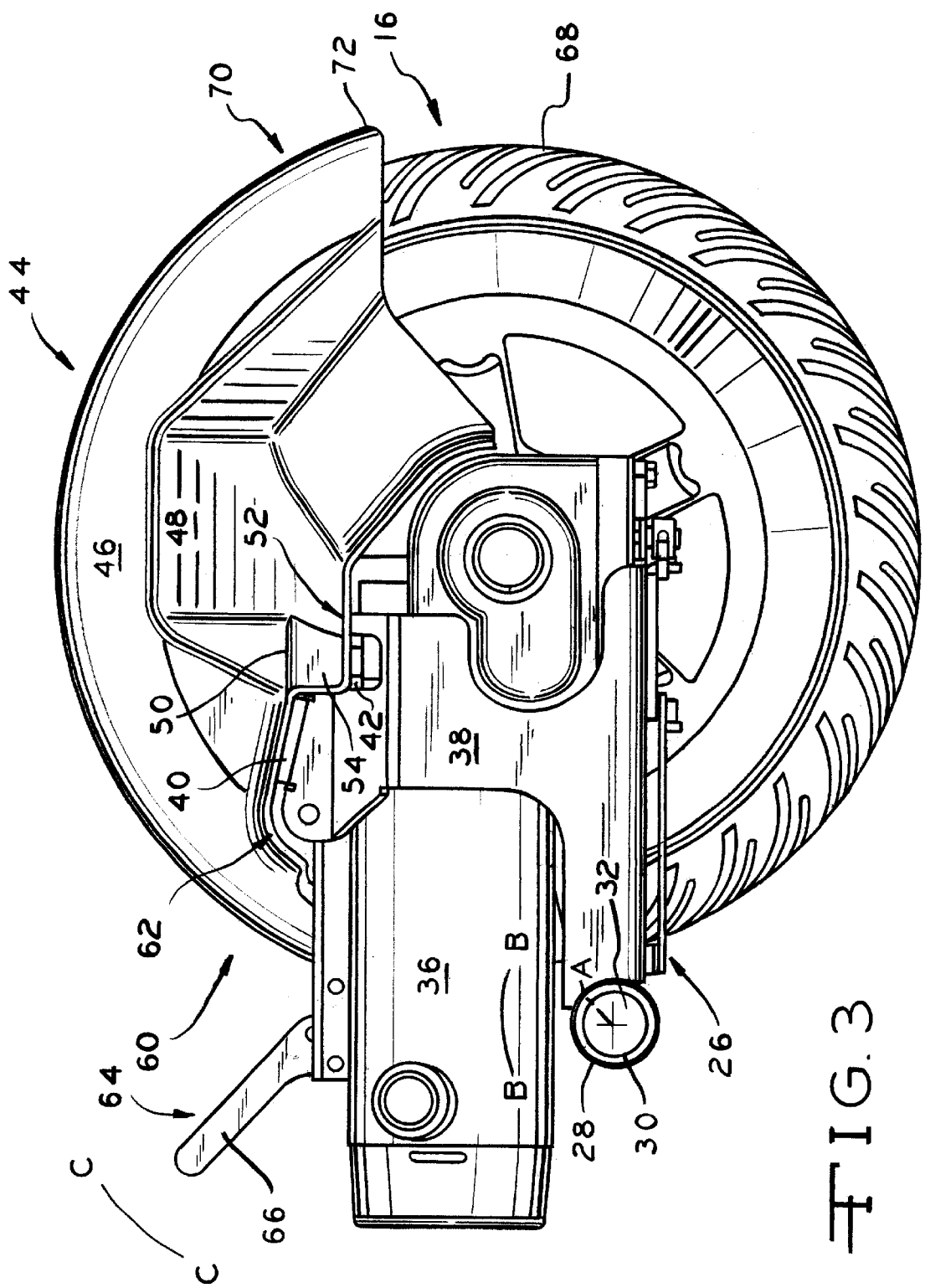
FIG. 3 is an enlarged side elevational view of the fender, swing-arm and drive wheel assembly shown in FIGS. 1 and 2.
Figure 4:
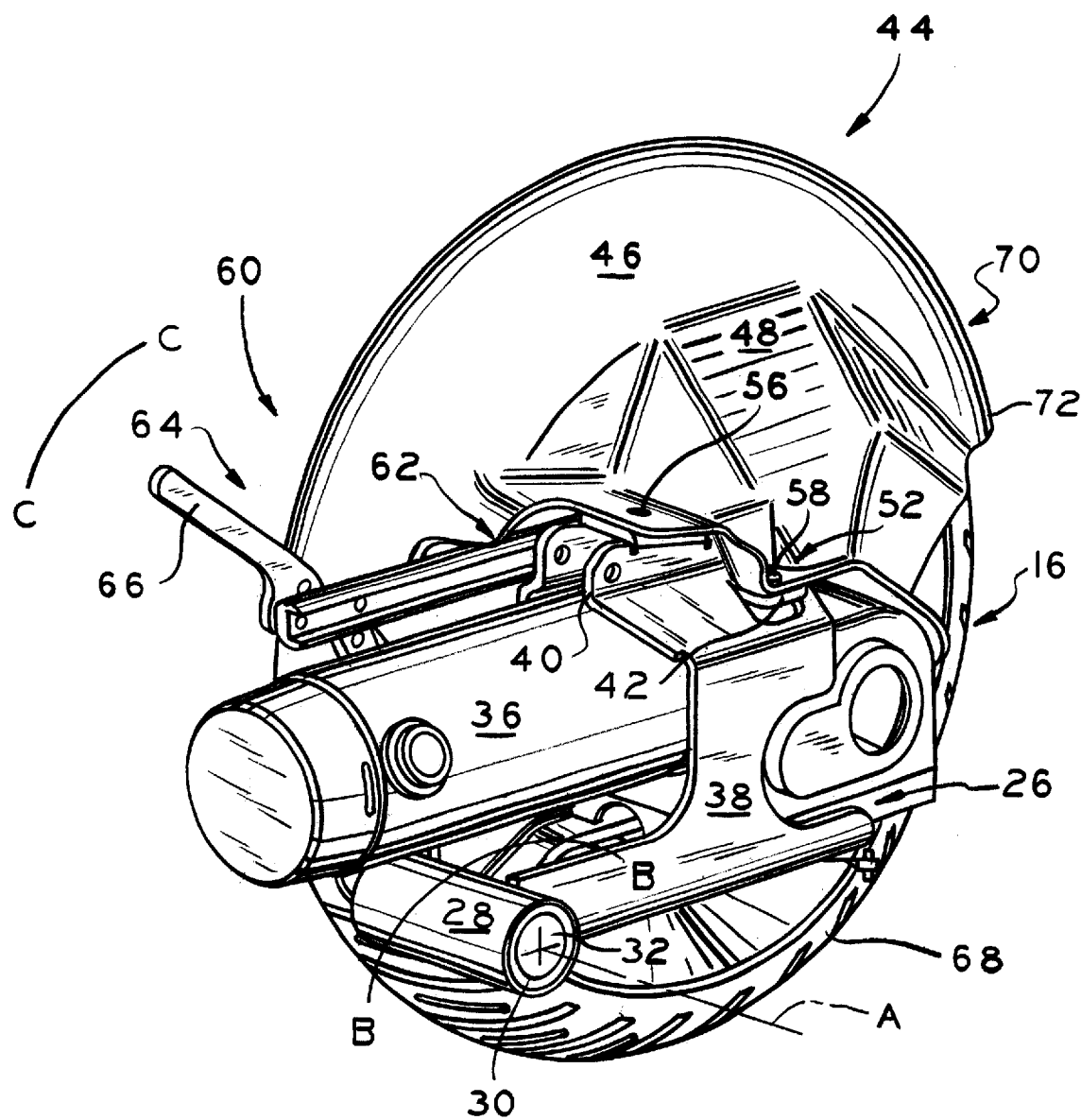
FIG. 4 is a front perspective view of the fender, swing-arm and drive wheel assembly shown in FIG. 3.

The drive wheels 16 are connected to opposing sides of the base frame 12 via a pair of swing-arms or motor mounts 26. Each swing-arm 26 has a lateral sleeve 28 located at the front end thereof. The sleeve 28 defines a cylindrical bore 30, the focal point of which defines a pivot axis A (shown in FIGS. 2 through 5). The sleeve 28 is adapted to receive a lateral rod 32. The lateral rod 32 is mounted to be rotated about pivot axis A and relative to the sleeve 28 along the line B—B (also shown in FIGS. 2 through 5). A resilient suspension member 34 is interposed between the base frame 12 and the swing-arm 26 to resist movement by the swing-arm 26 and absorb shock sustained by the wheelchair when maneuvering the wheelchair over rough terrain or obstacles.

Each swing-arm 26 supports a motor 36 for driving a drive wheel 16. Each drive wheel 16 is supported on a rotatable shaft extending transversely from the motor 36. The drive wheels 16 are differentially driven by the motors 36 to permit the wheelchair to be maneuvered in various directions. The motors 36 are energized by a power source and controlled by an electronic controller, which can be adapted to operate in response to movement of a joy stick (not shown).

Each swing-arm 26 forms a shroud 38 around a corresponding motor 36. An upper portion of the shroud 38 includes a bridge element 40 and a tab 42. The bridge element 40 and tab 42 each define a support surface for supporting a fender 44, which will become more apparent in the description that follows. The bridge element 40 and tab 42 each have an aperture (not shown) therein. The apertures are preferably threaded for receiving a threaded fastener (also not shown) for releasably fastening the fender 44 to the shroud 38. Alternatively, the fender 44 may be connected to the motor 36.

The fender 44 includes a main body portion 46 that defines a well for receiving the drive wheel 16, or at least an upper portion of the drive wheel tire 68. The main body portion 46 has an arcuate shape that is complementary, or that conforms closely, to the shape of the drive wheel 16 and is adapted to be connected to the shroud 38 so as to remain in close proximity to the drive wheel 16. In this way, the fender 44 does not interfere with the maneuverability of the wheelchair in close quarters.

An awning 48 jets off or extends laterally from an inner surface of the main body portion 46. The awning 48 is provided for covering the rear end of the motor 36 and the drive shaft (not shown) extending from the motor 36. The awning 48 also increases the structural integrity of the fender 44 and the connection of the fender 44 to the shroud 38. The structural integrity of the fender 44 is enhanced by a first web 50 that extends between the main body portion 46 and the awning 48 and further by a flange 52 that jets off an inner surface of the awning 48 and an inner edge of the first web 50. The flange 52 is primarily L-shaped in construction and has a second web 54 at the intersection of the two legs of the flange 52. The second web 54 extends longitudinally between the small leg of the flange 52 and the awning 48 and laterally between the large leg of the flange 52 and the first web 50. This arrangement provides a structure suitable for supporting the main body portion 46 in a substantially fixed position relative to the shroud 38.

The first web 50 is provided with a first aperture 56 and the flange 52 is provided with a second aperture 58. The first aperture 56 is adapted to align with the threaded aperture (not shown) in the bridge element 40 and the second aperture 58 is adapted to align with the threaded aperture in the tab 42. Threaded fasteners may be inserted into and through the first and second apertures 56, 58 and into the threaded apertures to secure the first web 50 to the bridge element 40 and the flange 52 to the tab 42. The awning 48, first web 50 and flange 52 cooperate to rigidly support the fender 44 in the fixed position relative to the shroud 38.

The front end, generally indicated at 60, of the fender 44 is provided with a relief or cutout 62 which provides a passage for a wheel lock 64. The wheel lock 64 may be attached to the motor 36 or the shroud 38, or elsewhere on the swing-arm 26. The wheel lock 64 has a lever 66 that is displaceable along the line C—C (shown in FIGS. 2 through 5) to move a knurled element (not shown) into and out of engagement with the drive wheel tire 68.

The rear end, generally indicated at 70, of the fender 44 has a lip 72 that extends rearward and downward from the main body portion 46. The lip 72 is adapted to prevent substance from the terrain from being directed from the drive wheel tire 68 up over the main body portion 46.

In operation, the fender 44 is connected to the swing-arm 26 and is adapted to remain connected to the swing-arm 26 throughout the operation of the wheelchair. As the wheelchair travels, the fender 44 prevents substances, such as liquids or debris, from being lifted from the ground and over the fender 44, thus protecting the wheelchair and the wheelchair occupant (not shown). As the wheelchair crosses uneven terrain or obstacles, the base frame 12 pivots relative to the swing-arm 26. The base frame 12 is permitted to freely pivot unencumbered by the fender 44.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. In combination:
    a wheelchair swing-arm adapted to be pivotally connected to a wheelchair base frame, the wheelchair swing-arm being further adapted to support a wheelchair drive wheel; and
    a fender supported in a substantially fixed relation to the wheelchair swing-arm so that the fender moves with the swing-arm, wherein the wheelchair swing-arm supports a motor for driving the wheelchair drive wheel and the fender is connected directly to the motor.

2. A wheelchair comprising:
    a base frame;
    a swing-arm pivotally connected to the base frame, the swing-arm being adapted to support a wheel; and
    a fender supported in a substantially fixed relation to the swing-arm so that the fender moves with the swing-arm, wherein the wheelchair swing-arm supports a motor having a shaft for driving the wheel, the fender being connected directly to the motor so as to move with the swing-arm and relative to the base frame.

3. A method of attaching a fender to a wheelchair comprising the steps of:
    (a) providing a wheelchair having a base frame, a swing-arm pivotally connected to the base frame, a drive wheel motor supported by the swing-arm; and
    (b) supporting a fender in a substantially fixed relation to the swing-arm so that the fender moves with the swing-arm by connecting the fender directly to the drive wheel motor so as to remain in a substantially fixed relation to the swing-arm.

4. A wheelchair comprising:
    a base frame;
    a swing-arm pivotally connected to the base frame, the swing-arm supporting a motor having a drive shaft supporting a drive wheel, the swing-arm defining a shroud having a bridge element and a tab each having a threaded aperture;
    a fender supported in a substantially fixed relation to the swing-arm, the fender including:
        a main body portion adapted to receive an upper portion of the wheelchair drive wheel,
        an awning extending laterally from an inner surface of the main body portion and covering the motor drive shaft,
        a web extending laterally from an inner surface of the main body portion and having an aperture aligning with the threaded aperture in the bridge element, and
        a flange extending laterally from an inner surface of the awning and having an aperture aligning with the threaded aperture in the tab; and
    a fastener inserted into the web and flange apertures and threadably engaging the threaded apertures of the bridge element and the tab.

5. A wheelchair comprising:
    a base frame;
    a swing-arm pivotally connected to the base frame, the swing-arm being adapted to support a wheel, the swing-arm defining a shroud having a threaded aperture;
    a fender supported in a substantially fixed relation to the swing-arm, the fender having an aperture aligning with the threaded aperture in the shroud, and
    a fastener inserted into the fender aperture and threadably engage the swing-arm aperture to connect the fender to the swing-arm.

* * * * *